US 7,861,152 B2

(12) United States Patent
Willebrand

(10) Patent No.: US 7,861,152 B2
(45) Date of Patent: Dec. 28, 2010

(54) DISPLAY APPARATUS FOR AUTOMATICALLY VISUALIZING AN APPLICATION LANDSCAPE

(75) Inventor: Fabian Willebrand, Frankfurt (DE)

(73) Assignee: Accenture Global Services Limited, Dublin (IE)

( * ) Notice: Subject to any disclaimer, the term of this patent is extended or adjusted under 35 U.S.C. 154(b) by 1069 days.

(21) Appl. No.: 11/585,669

(22) Filed: Oct. 24, 2006

(65) Prior Publication Data

US 2007/0097022 A1       May 3, 2007

(30) Foreign Application Priority Data

Oct. 27, 2005    (EP)    ................... 05023554

(51) Int. Cl.
*G06F 17/00*    (2006.01)
(52) U.S. Cl. ...................................... 715/212; 717/105
(58) Field of Classification Search ................ 715/212; 705/1; 717/100, 101, 105
See application file for complete search history.

(56) References Cited

U.S. PATENT DOCUMENTS

| | | | | |
|---|---|---|---|---|
| 2003/0187676 A1* | 10/2003 | Hack et al. | ...................... | 705/1 |
| 2004/0044987 A1* | 3/2004 | Kompalli et al. | ............. | 717/100 |
| 2004/0254945 A1* | 12/2004 | Schmidt et al. | ............. | 707/100 |
| 2005/0138160 A1* | 6/2005 | Klein et al. | .................. | 709/223 |
| 2006/0010453 A1* | 1/2006 | Illowsky et al. | ............. | 719/318 |
| 2006/0130056 A1* | 6/2006 | Bozak et al. | ................. | 717/174 |
| 2006/0224428 A1* | 10/2006 | Schmidt et al. | ................ | 705/8 |
| 2006/0224702 A1* | 10/2006 | Schmidt et al. | ............. | 709/219 |

FOREIGN PATENT DOCUMENTS

EP       1 785 847 A1       5/2007

OTHER PUBLICATIONS

Declaration dated Feb. 28, 2006, published with European Patent Application Publication No. EP 1 785 847 A1, dated May 16, 2007, at pp. 22-24.

* cited by examiner

*Primary Examiner*—Rachna S Desai
(74) *Attorney, Agent, or Firm*—Mannatus & Kang, P.C.

(57) ABSTRACT

A visualization system effectively presents even extraordinarily complex systems in a readily understandable manner. The visualization system generates and displays a process-product matrix that includes the applications assigned to each matrix coordinate, arranged in a compact and easily readable format. The resulting visualization is useful in identifying the relationships and interdependencies of the processes, products and applications employed by an organization. Constructing an optimized visualization of a complex structure such as an application landscape is itself complex, and requires consideration of multiple factors. This is especially true given the exponential number of applications-processes-products permutations that must be considered in constructing the visualization. The display apparatus and method used to visualize the application landscape provides a way to input the applications' assignments and filter preferences, and generate the visualization.

25 Claims, 11 Drawing Sheets

*Fig. 5B*

| *Fig. 5B (1)* | *Fig. 5B (2)* |
| --- | --- |
| *Fig. 5B (3)* | *Fig. 5B (4)* |

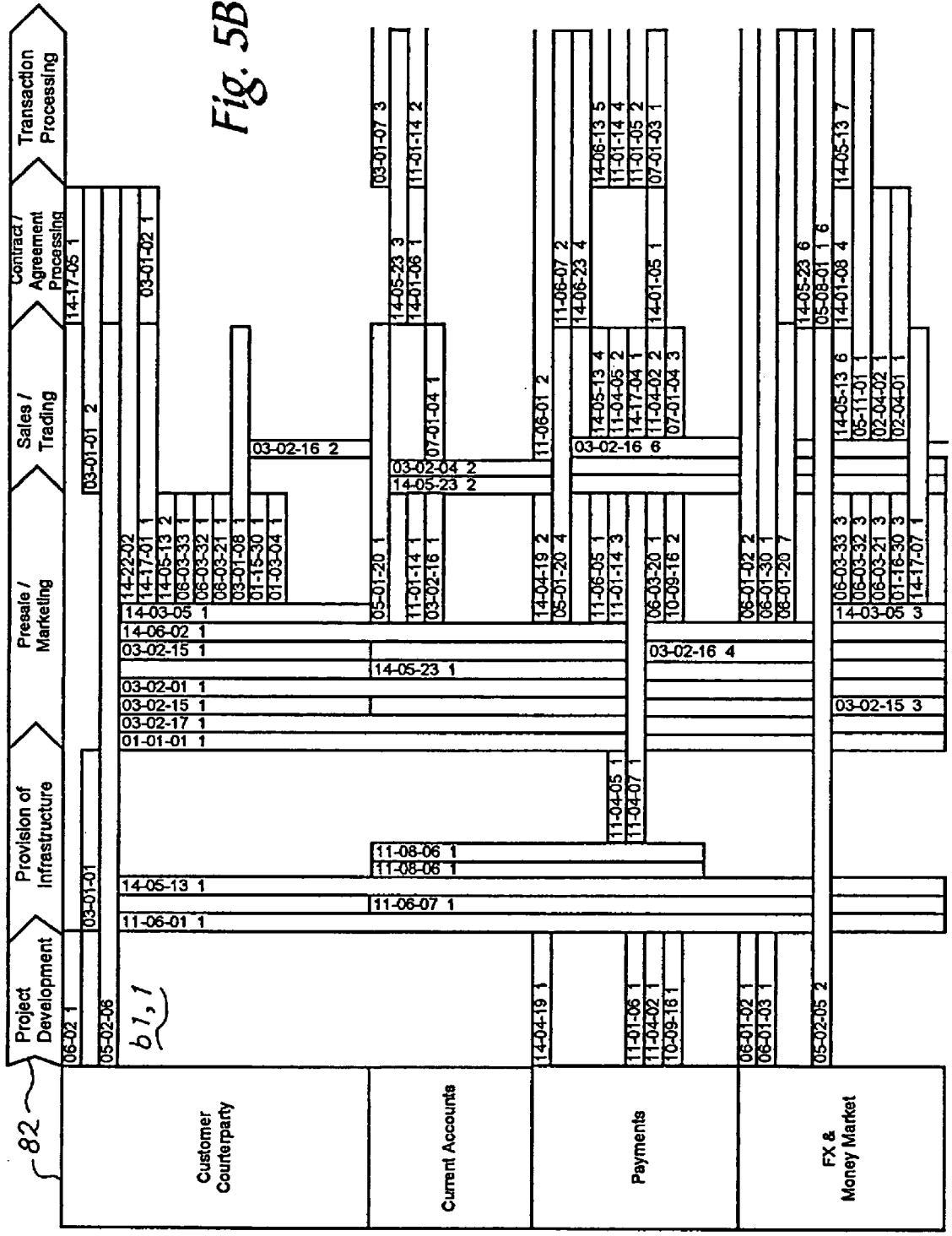

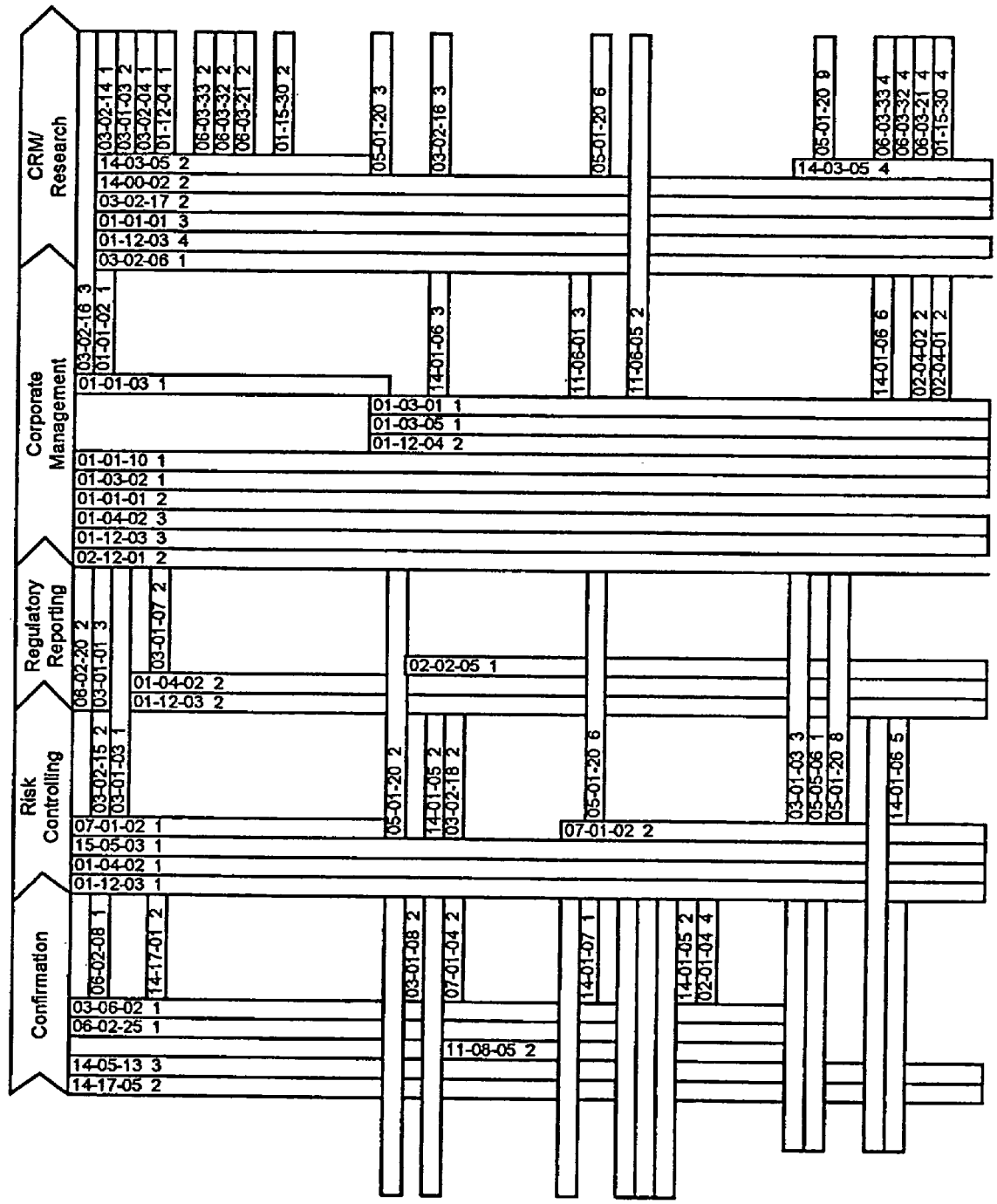
Fig. 5B (2)

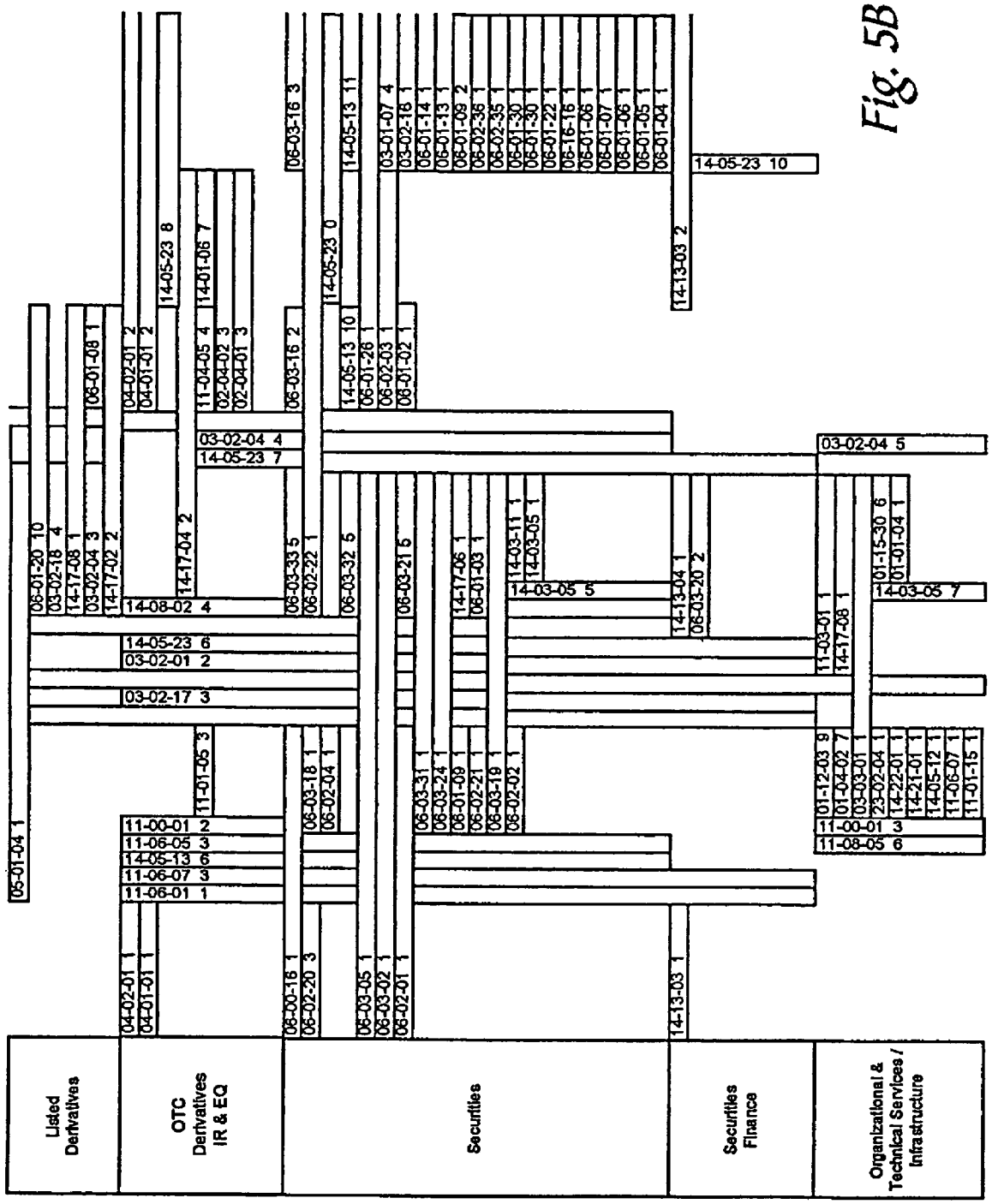
Fig. 5B (3)

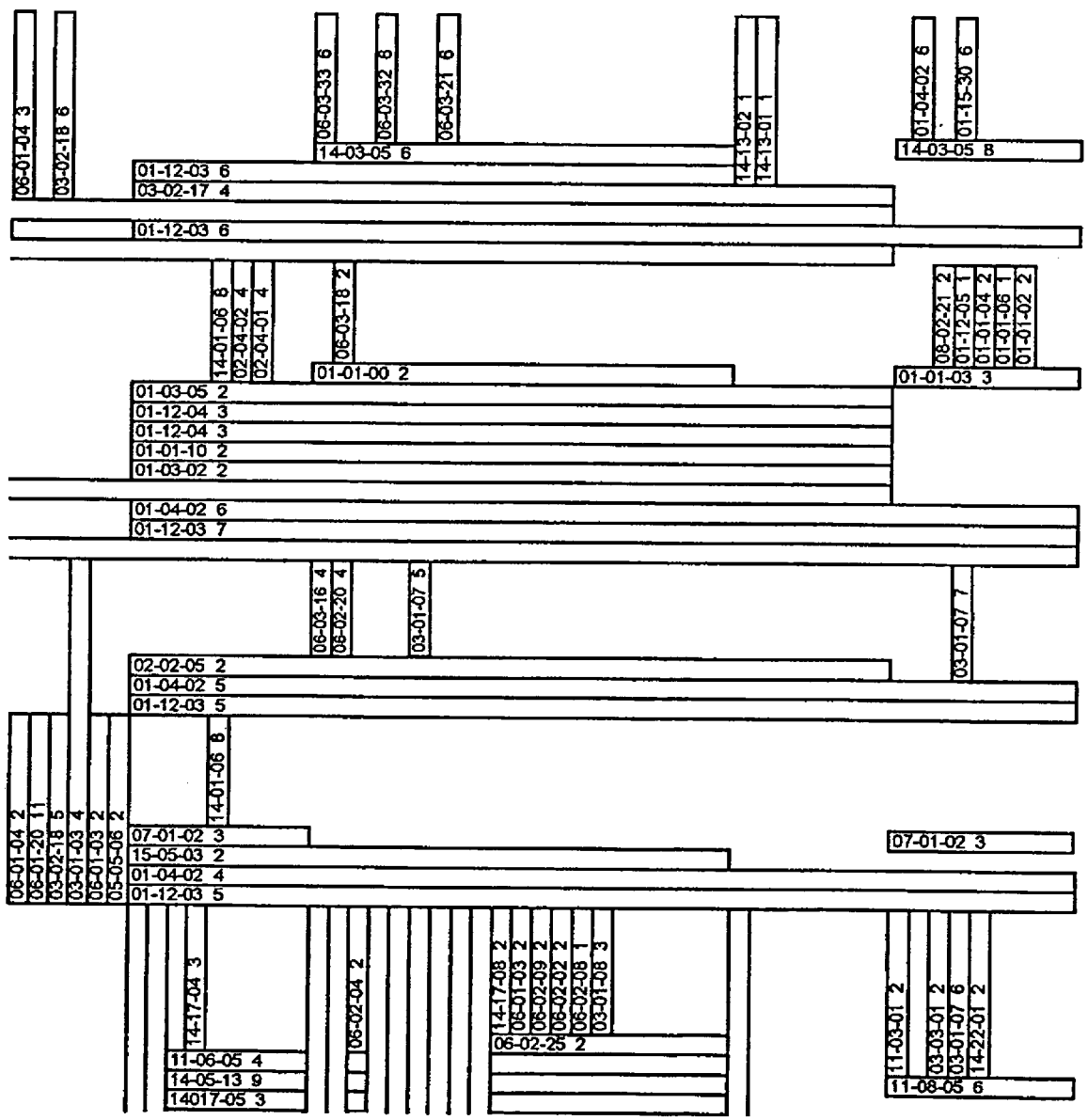
Fig. 5B (4)

DISPLAY APPARATUS FOR AUTOMATICALLY VISUALIZING AN APPLICATION LANDSCAPE

BACKGROUND OF THE INVENTION

1. Priority Claim

This application claims the benefit of priority from the European Patent Office (EPO) Application No. 05023554.8, filed Oct. 27, 2005, which is incorporated herein by reference.

2. Technical Field

The present invention concerns electronic visualization of complex systems. In particular, this invention relates to a computer-implemented method for visualizing a process-product matrix that shows the applications employed at the individual steps or work flow stages of each process in relation to a corresponding product's life-cycle.

3. Related Art

In the manufacturing industry, as well as in the service sector, any product offered or produced by a company involves a series of stages of work, including development, production, marketing, and risk management. In the automotive industry, for example, a series of industrial products such as tires, mudguards, windows, and electronic components are fabricated, bought, sold, and assembled. For each of these products, a series of processes made up of single work steps and complex workflows arise. These processes may include designing, quality management, component testing, warehouse management, component assembly, back-end testing, and many other processes.

Most of these processes are supported by a series of Information Technology (IT) applications. The designing processes may be supported by computer aided design (CAD) software, for example. The same CAD applications are often applied in connection with several products, such as mudguards, hoods, and dashboards. Accordingly, the same application supports a certain process performed in connection with different products. Other applications may be used in connection with different processes on a certain product. For example, specialized software for simulating and evaluating aerodynamics may be employed both for designing and testing mudguards. Other applications may support different processes on different products. In particular, internal communication software or software for stock control, for example, may be applied in connection with a series of different processes on different products.

Similar application-process-product structures also exist in service sector companies, the products of which are typically service-oriented, such as the deposit, lending, or securities businesses within a banking company, for example. The processes performed in connection with these products are also supported by multiple applications, where again each application may support a series of processes for a series of products. Some applications may use information provided by another application or may have an overlap in the data or even in the algorithm used.

When the business processes or subject responsibilities in a company change, the requirements on existing applications also change. When replacing or modifying an individual application used in connection with a certain process, however, it is typically insufficient to look only at its immediate context within this process. Small changes in an application for a certain process may require further corresponding changes where the application is applied in connection with a different process or a different product. Accordingly, changing a company's IT-structure requires a detailed understanding of these complex structures. These structures represent the extremely complex interactions and relationships of numerous applications to countless processes supporting extensive arrays of products, otherwise referred to as the application landscape.

The visualization of an application landscape, particularly the complex structure connecting the processes of products to the respective software applications, provides a useful guide. In big companies, a large number of IT-applications typically are used for supporting processes performed in connection with multiple products. The IT management is particularly difficult when the IT architecture is developed gradually and is highly complex. Accordingly, the resulting visualization of the application landscape becomes large and confusing. When presenting the application landscape on a conventional visual medium, such as a monitor or a reasonably sized printout, the labelling of the individual processes, products and applications becomes illegibly small. The finite resolution of conventional screen displays makes the visualization task even more difficult.

A need has long existed for a system that facilitates visualizing, reviewing and understanding the interdependent relationships of processes, products and applications as well as addressing other difficulties associated with displaying highly complex structures of this nature in a compact and easily readable manner.

SUMMARY

The present invention provides a display apparatus for visualizing an application landscape. The application landscape represents the assignment of applications to multiple processes performed in connection with one or more manufacturing or services products. The applications may include, as examples, computer programs, subroutines or databases, and the processes may include, as examples, individual steps or work flows in the various stages of development, production, marketing or risk management of a product. The products may include, as examples, manufactured products such as mudguards, car seats, or control instruments in the automotive industry, or services products, such as deposit, lending, or securities instruments of a banking or financial services firm.

The display apparatus may include an input device used to define the assignment of the applications employed by those processes performed in connection with producing one or more products, a matrix definition component used to create a matrix made up of cells defined by rows representing the products and columns representing the processes, and a cell assignment component used to create for each cell a content container identifying the applications assigned to the process used in connection with the product represented by the cell. The apparatus may also include an evaluation component capable of reading the content container of each cell to determine the applications assigned to the cell and, for each application, performing a presentation preparation step. The evaluation component also determines the minimum width or height of each column or row, respectively, necessary to enclose a presentation box. The apparatus also includes an output device for visualizing the matrix with, for example, a presentation box enclosing an application identifier. The various components included in the display apparatus, such as the matrix definition component, cell assignment component and evaluation components, may be implemented as hardware, software, or a combination of hardware and software.

The presentation preparation step may include selecting a presentation direction, for example horizontal or vertical depending on how many of the content containers of the cells in the current row and column contain the application. The presentation preparation step may further include defining a presentation box extending in the presentation direction over one or more cells including the current cell and all cells in which the application is identified in a corresponding content container positioned in the presentation direction side-by-side to each other adjacent to the current cell. In addition, the presentation preparation step may also include determining an application identifier that will be presented in the presentation box, and determining the minimum size of the presentation box necessary for enclosing the application identifier.

Accordingly, the display apparatus automatically visualizes an application landscape in a clearly structured and easily readable manner. In particular, the automatic adaptation of the presentation direction for an application to the number of appearances of the application in the corresponding row and column, together with the extension of the presentation box in the presentation direction in order to combine multiple appearances of a single application in neighbouring cells within one presentation box results in a compact visualization of the application landscape. In addition, the automatic adaptation of the presentation direction allows for a reliable visualization of the structure of the application landscape by emphasizing the connection of different processes or products via common applications. Moreover, the automatic determination of the box size depending on the application identifier, which may be a logo and/or a name of the application, for example, ensures the readability of the presentation.

Other systems, methods, and features of the visualization techniques will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

FIG. 5B shows an application landscape presented with more detail by a display apparatus.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations may be depicted as being stored in memories, all or part of systems and methods consistent with the display apparatus system and method may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the display apparatus system will be described, methods, systems, and articles of manufacture consistent with the display apparatus system may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Furthermore, the programs, or any portion of the programs, may instead be implemented in hardware.

Figure 1:
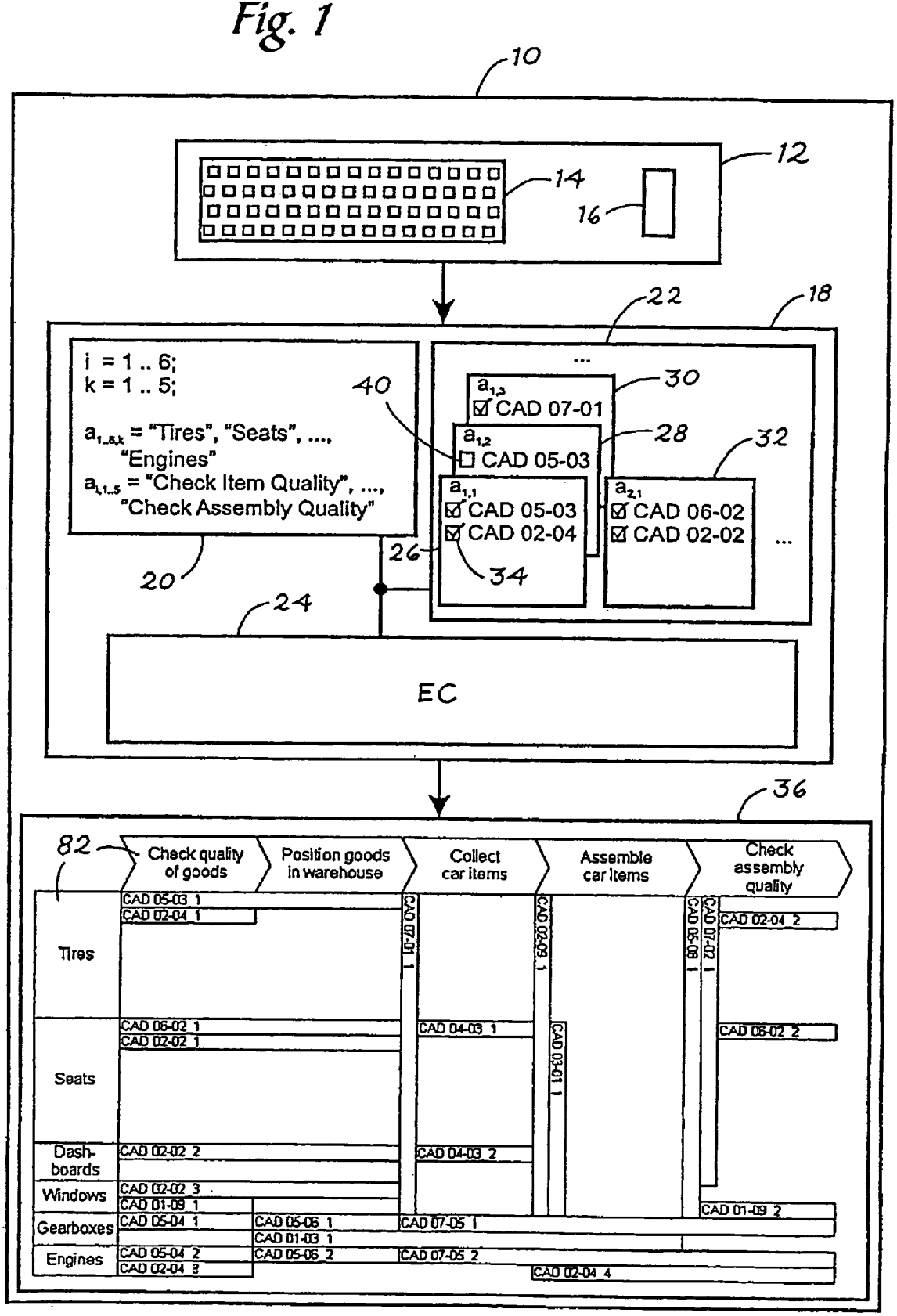
FIG. 1 illustrates a display apparatus made up of an input device, processing unit and output device.

FIG. 1 shows an alternative implementation of a display apparatus 10. FIG. 1 includes an input device 12 for receiving, for example, application assignment data. An operator may input data using the keyboard 14, which may be included as part of the input device 12. Alternatively, the display apparatus 10 may include an interface 16 for receiving and/or transmitting data via a network, such as the Internet. The interface 16 may be directly connected to a network in a company, where at least part of the applications to be visualized as an application landscape run on this network. Particularly, such an application landscape may correspond as described above to a complex structure connecting processes on products with the respective software applications, thereby offering a useful support. In particular, an application landscape may be visualized by means of a process-product matrix, where one axis shows multiple processes, while the other axis presents multiple products. The apparatus 10, in an alternative implementation, may be capable of communicating with the applications via the interface 16. The display apparatus 10 may automatically receive data defining correlations and assignments of individual applications to certain processes and/or products from the network. The display apparatus may also send status requests to the network and/or to individual applications and perform consistency checks for the application structure or for certain workflows based on the response to the status requests received via the interface 16.

FIG. 1 particularly demonstrates an example from the automotive industry where the data received via the input device 12 define products and processes typical for a company fabricating cars and car equipment. The products, for example, include "tires," "seats," "dashboards," "windows," "gearboxes," and "engines." As typical processes performed in the automotive industry in connection with the list of example products, FIGS. 1 and 2 mention the processes of "check quality of goods," "position goods in warehouse," "collect car items," "assemble car items," and "check assembly quality." Whenever a certain process, such as checking the quality of goods, is performed for or in connection with a certain product, such as tires, for example, this particular work step is supported by certain applications. In the present example, checking the quality of tires is supported by the applications "CAD 05-03" and "CAD 02-04." One of these applications may be control software for a robot camera and/or a test apparatus, such as a centrifuge for testing tires. Further, as an example, one of the applications may be database management software. Although, the display apparatus is described for the automotive industry in the following, the same components and structural details of the display apparatus 10 also applies to any other business sector.

The input data are transmitted to and processed by a processing unit 18 of the display apparatus 10. In the present embodiment, the processing unit 18 includes a matrix definition component 20, a cell assignment component 22 and an evaluation component 24. Based on the received data, the matrix definition component 20 defines a matrix that has multiple cells arranged particularly in rows and columns. The matrix definition component 20, in one implementation, may define row indices i and column indices k, so that each cell in the matrix is identified by the pair of indices (i, k). In the example shown in FIG. 1, the matrix definition component 20 defines a matrix with six rows (i=1 to 6) and five columns (k=1 to 5), where each row represents one product typical for the automotive industry, for example, "tires," "seats," and "engines." Each column on the other hand represents a particular process performed in the automotive industry in connection with fabrication or assembling the products, for example. These processes, for example, include "checking quality of goods," "position goods in warehouse," and "assemble car items."

For each of the cells defined by the matrix definition component 20, the cell assignment component 22 creates a content container, four of which are shown and labelled 26, 28, 30, and 32. The content containers 26, 28, 30, and 32 may be lists of applications assigned to a particular cell, such as those applications used with a particular process performed in connection with a particular product. Based on the respective assignment data received via the input device 12, the cell assignment component 22 adds the applications to the respective content containers. The two applications "CAD 05-03" and "CAD 02-04" assigned to the particular process of checking the quality of tires, for example, are added to the content container 26 of a first cell $a_{1,1}$, which represents the process "check quality of goods" in connection with the product "tires," and may mean that these two IT-applications are applied when the quality of tires is checked. Further, as shown in FIG. 1, the cell assignment component 22 assigns an activation status to each application listed in the content containers 26, 28, 30, 32. The activation status determines whether the presentation preparation step for an application is performed, represented by checkboxes or elements 34.

Starting from the matrix as defined by the matrix definition component 20 and the content containers defined by the cell assignment component 22, the evaluation component 24 may scan through the matrix cell-by-cell, determine the applications assigned to the cell, and perform a presentation or display preparation step for each application. For example, the presentation preparation step may include determining the minimum width of the columns and the minimum height of the rows of the matrix. The evaluation component 24 then transmits the matrix data to an output device 36, as shown in FIG. 1. The output device 36 may include a monitor, a video projector, a printer, or any other output device capable of visually presenting or displaying the matrix.

Figure 2:
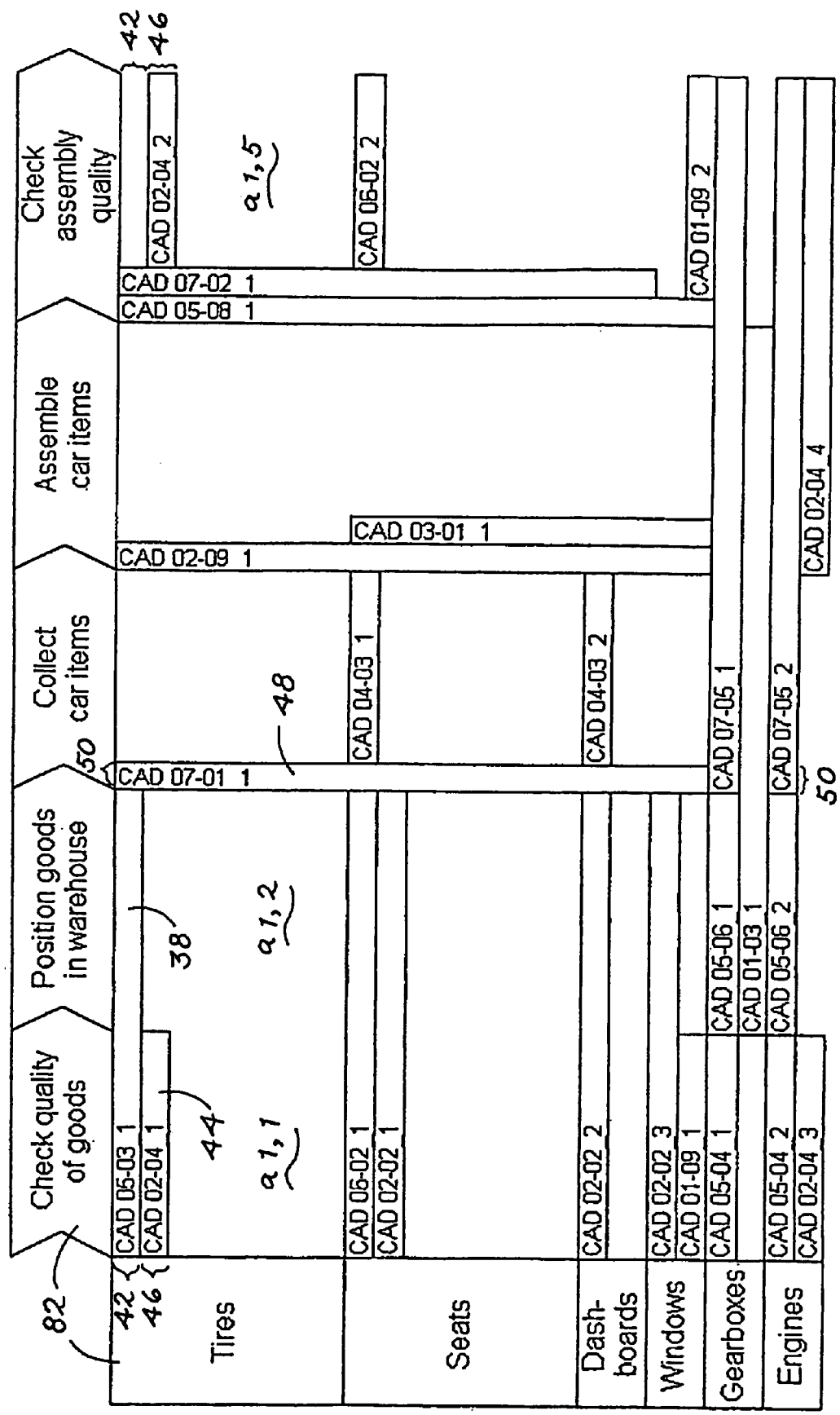
FIG. 2 shows an application landscape presented by the display apparatus.

The details of the operations performed by the evaluation component 24 according to an alternative implementation of the display apparatus become more apparent in connection with the finally achieved application landscape, as shown in more detail in FIG. 2. In particular, FIG. 2 shows an example application landscape typical for the automotive industry. As already described in connection with FIG. 1, each IT-application needed, when carrying out a particular process in connection with a particular product, may be entered in the cell which represents this process and the product in the process-product matrix. Alternatively, during the preparation of the process-product matrix, a priority status and/or rank value is assigned to each of the applications, and only those applications are considered when the priority status and/or rank value is higher than a predefined detail value. Employing a priority status and/or rank value to indicate those applications that will be included in the process-product matrix visualization allows for the reduction in size of the resulting matrix depending on the desired degree of details to be presented.

In the alternative implementation presented in FIG. 2, upon checking the quality of tires, the two applications "CAD 05-03" and "CAD 02-04" are carried out. Accordingly, these two applications are listed in the content container 26 of the cell $a_{1,1}$, which represents the process "check quality of goods" for the product "tires." This first cell $a_{1,1}$, may be presented on the upper left corner of the process-product matrix as presented in FIG. 2. The mentioned applications may also be listed in further content containers. The application "CAD 05-03," for example, is also listed in the cell $a_{1,2}$, indicating that this application is also needed when positioning tires in the warehouse.

The evaluation component 24 may analyze each cell one after the other, in one implementation, by the row of the matrix (e.g., from the upper left corner to the lower right corner). In particular, the evaluation component 24 reads the content containers 26, 28, 30, 32 of each of the cells. The evaluation component 24 starts with the content container 26 of the first cell $a_{1,1}$ and recognizes the first application "CAD 05-03." A draw command is created for this application e.g., a first presentation box 38 is defined. For this, a presentation direction may be selected from a vertical and horizontal direction based on how often this first application appears in the same row and how often this application appears in the same column. The evaluation component 24 counts or lists how often this first application appears in the first row. In the example shown in FIG. 2 the first application "CAD 05-03" appears twice in the first row, namely in the cells $a_{1,1}$ and $a_{1,2}$, but only once in the first column, namely in the current cell itself. Accordingly, the horizontal presentation direction is selected for the first application in the first cell.

Next, the evaluation component 24 performs a step of checking whether the currently analyzed application also appears in the neighbouring cells which are adjacent (particularly arranged at left, right, upper and/or bottom side) to the current cell in the presentation direction. All cells positioned in the presentation direction relative to the current cell i.e., all cells in the current row or column, depending on the presentation direction, may be analyzed to check whether their content containers contain the currently analyzed application. Only those cells are considered in which the currently analyzed application is activated. In case such a cell adjoining the current cell in the presentation direction and containing the currently analyzed application in its content container is found, the current draw command is extended to this cell i.e., the presentation box is extended to cover part of the current cell and the respective neighbouring cell. Moreover, the presentation box is may be extended to all cells which are positioned in the presentation direction side by side to each other and which adjoin the current cell, so that a continuous presentation box is defined.

In the present example of FIGS. 1 and 2 the evaluation component 24 determines that the currently analyzed application "CAD 05-03" in the first cell $a_{1,1}$ is also listed in the content container 28 of a second cell $a_{1,2}$ arranged next to the first cell $a_{1,1}$ in the presentation direction, which in the present example is the row direction and in particular the horizontal direction. Accordingly, the draw command is extended e.g., in this particular instance the first presentation box 38 is extended to cover both the first cell $a_{1,1}$ and the neighbouring second cell $a_{1,2}$ which also includes the currently analyzed application. This first application "CAD 05-03" is therefore deactivated in the second cell $a_{1,2}$ as indicated by the empty checkbox 40 in FIG. 1.

Further, a first horizontal presentation slot 42 is provided for the first application "CAD 05-03" in the first row. This first horizontal presentation slot 42 represents a subdivision of the first row in vertical direction, while it extends over the whole matrix in horizontal direction. The first horizontal presentation slot 42 may be reserved for the first application "CAD 05-03," so that no other horizontally presented application uses the first horizontal presentation slot 42, which further may be provided at the upper end of the first row.

Further, the next application "CAD 02-04," which is activated and/or not deactivated, is read from the first content container 26 of the first cell $a_{1,1}$. It is found, that this application appears twice in the first row, namely in the cells $a_{1,1}$ and $a_{1,5}$, and twice in the first column, namely in the cells $a_{1,1}$ and $a_{6,1}$. As an alternative implementation as shown in FIG. 2, an application is only presented vertically if it appears more often by more than one in the current column than in the current row. Accordingly, the second application "CAD 02-04" in the first cell $a_{1,1}$ is also presented horizontally horizontal presentation box 44. The evaluation component 24 again performs a step of checking whether the second application "CAD 02-04" also appears in neighbouring cells, which are adjacent (particularly arranged at left, right, upper and/or bottom side) to the current cell in the presentation direction. The same analysis may be performed as for the first application.

In the demonstrated example, no neighbouring cell in the horizontal direction contains the second application "CAD 02-04," and the second presentation box 44 is drawn so as not to extend beyond the first cell $a_{1,1}$. A second horizontal presentation slot 46 is provided and the second application "CAD 02-04" is assigned thereto. The second horizontal presentation slot 46 may border on the first horizontal presentation slot 42 and may be positioned directly underneath the first. Further, the second horizontal presentation slot 46 may be reserved for the second application "CAD 02-04" so that no other application is positioned within this slot at this stage of the presentation preparation procedure.

Before creating and/or reserving a new presentation slot, the evaluation component 24 may check whether a presentation slot for the particular presentation direction that is assigned to the currently analyzed application already exists in the currently analyzed cell. Such a presentation slot may have been defined during the analysis of a previous cell also containing the currently analyzed cell. If such a presentation slot already exists the presentation box for the application is assigned to this presentation slot. In the shown example, since the second application "CAD 02-04" also appears in the rightmost cell of the first row (cell $a_{1,5}$), the same presentation slot 46 is also in this cell. A count index may also be added to the application identifier for the applications and may be presented in the presentation box when displaying the application landscape. According to the implementation shown in FIG. 2, the index "2" added to the application identifier "CAD 02-04" in the cell $a_{1,5}$ may indicate that in this cell it is the second time that the application appeared in the matrix with an activated status, while in the first cell $a_{1,1}$ the application appeared for the first time.

After the content container 26 of the first cell $a_{1,1}$ has been read completely, the next cell, an adjacent cell (the second cell $a_{1,2}$ according to the implementation shown in FIG. 1), may be analyzed so that its content container 28 is read. As shown in FIG. 1, however, the content container 28 of the second cell $a_{1,2}$ has no activated application listed so that the process continues with analyzing the third cell, which may be cell $a_{1,3}$, according to one implementation. The third cell $a_{1,3}$ only contains one application "CAD 07-01," which appears only once in the current row (the first row), but four times in the present column (the third column). Accordingly, a vertical presentation direction is selected for this third application, "CAD 07-01." As shown in FIG. 2, all four cells in the current column containing the third application "CAD 07-01" are neighbouring cells in the vertical direction, the draw command extends the third presentation box 48 in the vertical direction to cover part of these four cells. While the application remains activated in the current cell (the third cell $a_{1,3}$), it is deactivated in the three additional cells below the current cell, to which the third presentation box 48 is extended. The third presentation box is assigned to first vertical presentation slot 50, which is a subdivision of the third column in the horizontal direction and which extends over the whole matrix in vertical direction. This first vertical presentation slot 50 may be positioned at the left edge of the third column. After reaching the end of the first row, the evaluation component 24 may continue with the second row e.g., with the leftmost cell $a_{2,1}$ in the second row, and so on.

Figure 3A:
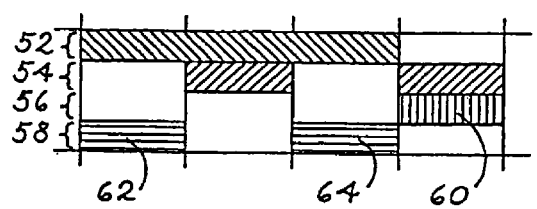
FIG. 3 shows the combination or grouping step performed on presentation slots by the evaluation component.

After analyzing all cells as described above, the evaluation component 24 may perform a combination and/or grouping step, in which the presentation slots are combined where possible, in order to make the application landscape more compact, as is shown in FIG. 3. FIG. 3A shows four neighbouring cells within one row. Four different applications (indicated with four different shadings) are assigned to four different horizontal presentation slots 52, 54, 56, 58.

Figure 3B:
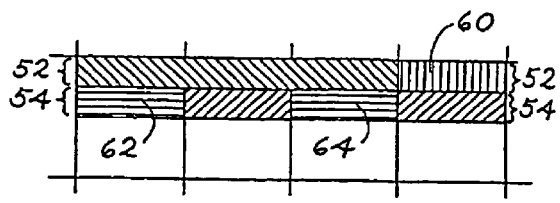

The evaluation component 24 may analyze the individual presentation slots within one row and/or column e.g., starting at a first presentation slot 58 and then check whether another presentation slot within the same row or column is empty i.e., not occupied by a presentation box, in all cells where the first presentation slot is occupied by presentation boxes 62, 64. If such a second presentation slot 54 is found, the presentation boxes 62, 64 of the first presentation slot 58 are shifted to the second presentation slot 54. As in the row shown in FIG. 3A, the application assigned to a third presentation slot 56 only covers the rightmost cell. While the rightmost cell is not covered by the application which is assigned to the fourth horizontal presentation slot 52, a presentation box 60 of the third application can be shifted from the third horizontal presentation slot 56 to the fourth horizontal presentation slot 52, without creating an overlap of presentation boxes with the same presentation direction. Analogously, the presentation boxes 62 and 64 in the horizontal presentation slot 58 can be simultaneously shifted within their cell to the horizontal presentation slot 54, which is not occupied by other presentation boxes in the first and the third column, respectively. The resulting compact presentation is shown in FIG. 3B. The third 56 and fourth 58 horizontal presentation slots may be empty at this stage, so that they may be deleted.

The overlap of presentation boxes with different presentation directions may be reduced. FIG. 4 demonstrates a procedure performed by the evaluation component 24 according to one implementation of the display apparatus. The evaluation component's steps to reduce overlap of presentation boxes may be performed before the presentation boxes are presented via the output device 36. FIG. 4 shows four stages of the procedure performed by the evaluation component to reduce overlap of presentation boxes that have different presentation directions. The demonstrated section of an application landscape includes a first cell 66, a second cell 68 next to the first cell 66 in the same row, and a third cell 70 next to the first cell 66 within the same column. The presented section shows three horizontal presentation boxes 72, 74, and 76 and two vertical presentation boxes 78 and 80.

Figure 4A:
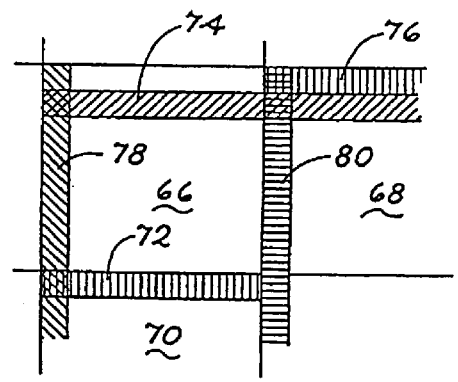
FIG. 4 shows four stages of the procedure performed by the evaluation component to reduce overlap of presentation boxes that have different presentation directions.
Figure 4B:
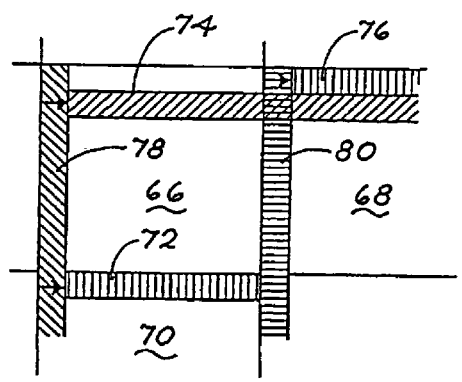
Figure 4C:
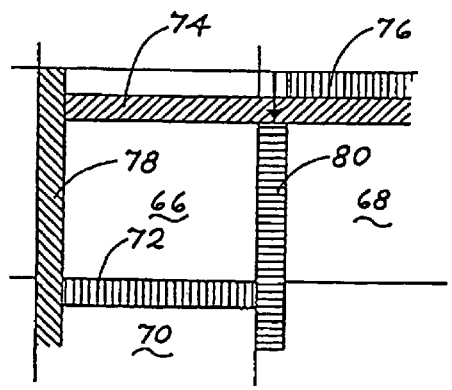
Figure 4D:
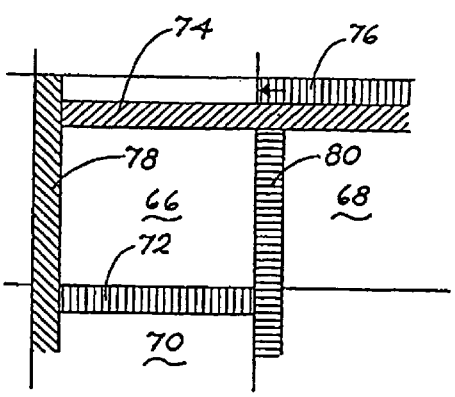

In a first step, demonstrated in FIG. 4B, the left edges of the horizontal presentation boxes 72, 74, and 76 are shifted to the right within the respective cell until these horizontal presentation boxes no longer overlap with the vertical presentation boxes 78 and 80 within the respective cell. For each horizontal presentation box, the left edge is only shifted within one cell. In particular, the left edge of the second horizontal presentation box 74 is not shifted into the second cell 68 beyond the second presentation box 78. Instead, this left edge is only shifted within the first cell 66 until the second horizontal presentation box 74 no longer overlaps with the first vertical presentation box 78. Next, as shown in FIG. 4C, the upper edges of all vertical presentation boxes are shifted downward within one cell until the respective vertical presentation box no longer overlaps with any horizontal presentation box within the particular cell. In the situation demonstrated in FIG. 4C, the first vertical presentation box 78 does not overlap with any other cell in the first cell 66. Accordingly, the upper edge is not shifted. In the second cell 68, however, the second vertical presentation box 80 overlaps with the second horizontal presentation box 74, as seen in FIG. 4B. Accordingly, the upper edge of the second vertical presentation box 80 is shifted downwards until the second vertical presentation box 80 no longer overlaps with the second horizontal presentation box 74. Finally, as shown in FIG. 4D, the left edges of the horizontal presentation boxes are shifted to the left again within the same cell as far as possible without creating additional overlap on the horizontal presentation boxes with any vertical presentation box. Accordingly, the left edge of the horizontal presentation box 76 is shifted to the left edge of the second cell 68. This procedure reduces the overlap of different presentation boxes and, therefore, significantly improves the clarity and readability of the application landscape.

Before presenting or visualizing the application landscape in the form of the process-product matrix using the output device 36, the minimal height and the minimal width of each presentation box may be determined. The applications represented by the presentation boxes may be identified in the application landscape by presenting an identification pattern within the presentation boxes. This identification pattern or application identifier may include a sign, a logo, symbols, additional or different text or text patterns, and/or at least part of the name of the application. A step of determining the displayed size of the application identifier sufficient to be legible and/or identifiable and a step of assigning the required size of the respective presentation box at least sufficient to accommodate the respective application identifier may be performed.

The sizes of the presentation boxes may be determined on the basis of a defined font style, font size and text pattern, such as XX-XX-XX-XX, for example, where the individual text fields in the text pattern represent application names, application versions and releases, sub-component interdependencies and/or other related configuration management metadata. The visualization may employ any other application identifier, however, including symbols, additional or different text or text patterns, and/or indexing information specifying intra and extra organizational configuration management interdependencies. Generally, the system determines the size of the presentation box to fit the application identifier. Depending on the presentation direction defined for the presentation boxes, the application identifier may be presented in the same presentation direction. Accordingly, the height of a horizontal presentation box may be defined by the height of the application identifier XX-XX-XX-XX in the predefined font style and font size, while the width of the horizontal presentation box may be defined by the length of the application identifier. For the vertical presentation boxes, the requirements for height and width are exchanged. Accordingly, the size of the presentation boxes is adapted so that the application's sign, logo, name, or any combination thereof is presented in a readable size.

Further, both the height and the width of a label box 82 can be determined from the length of the text to be presented for labelling the respective row and/or columns on the matrix. A special font style and font size may be defined for labelling, which may be different from the font style and size of the applications. When labelling the rows and columns i.e., labelling products and processes, the real names of the products and processes may be used to determine the required height and width of the labelling boxes 82 instead of using a text pattern such as described for application identifiers. The width of a column of the matrix may be given by the required width of the respective labelling box of the process, or by the width of a widest cell in the column, whichever is wider. The width of a cell increases as more vertical presentation boxes are included. The analogous correlation applies for height of the cell in connection with the horizontal presentation boxes. After determining the height and width for all rows and columns, the output device presents the application landscape, where identification patterns, such as labelling, are presented for each presentation box including the presentation boxes for the applications and the labelling of the processes and products. The applications, processes, and products may be colour-coded. The application landscape may be directly presented visually, by means of a monitor and/or a printer. Further, the result may also be saved in a PNG file, a Corda-XML file, or any other image or graphic file format.

Figure 5A:
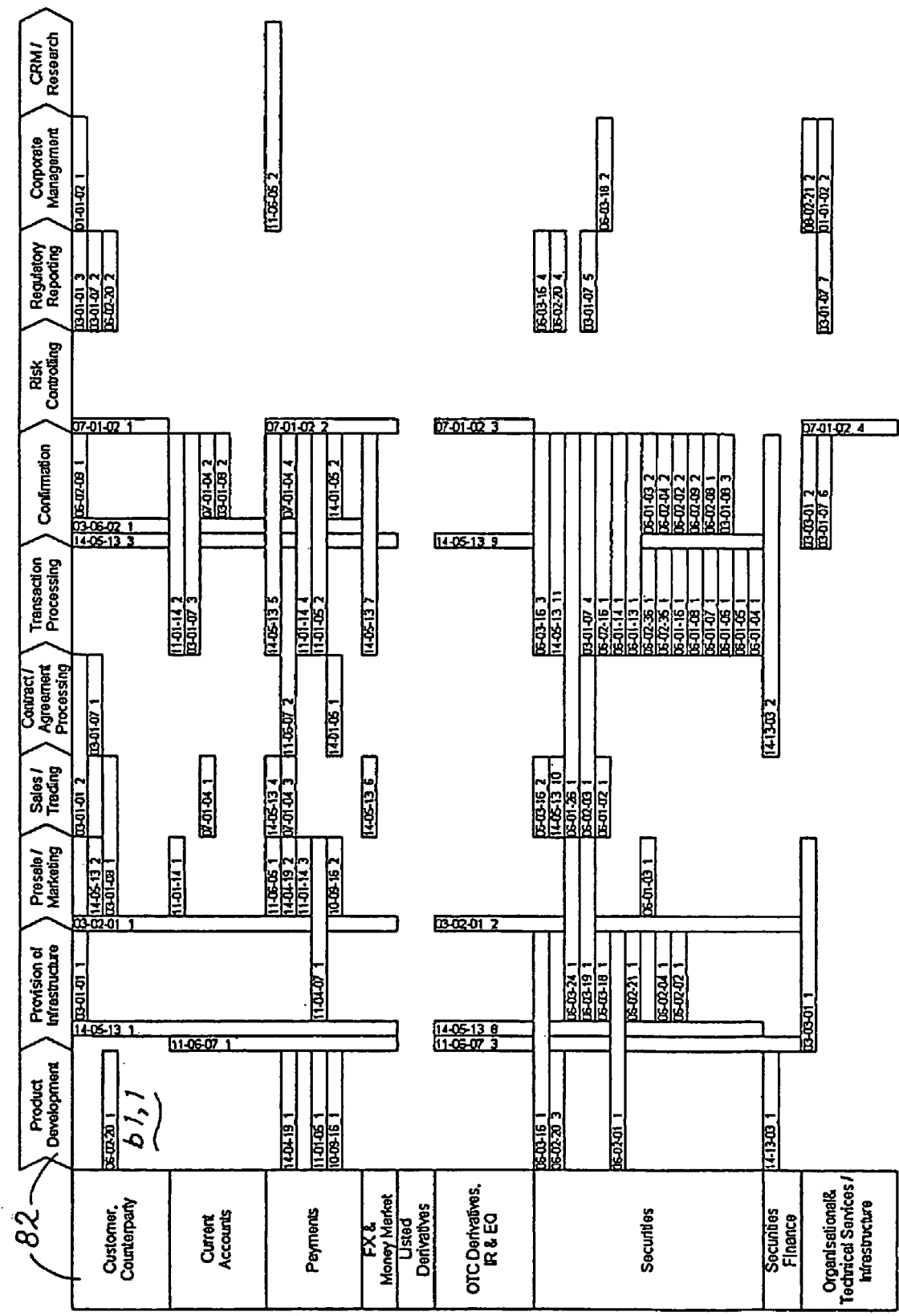
FIG. 5A shows an application landscape presented with less detail by a display apparatus.
Figure 5B:
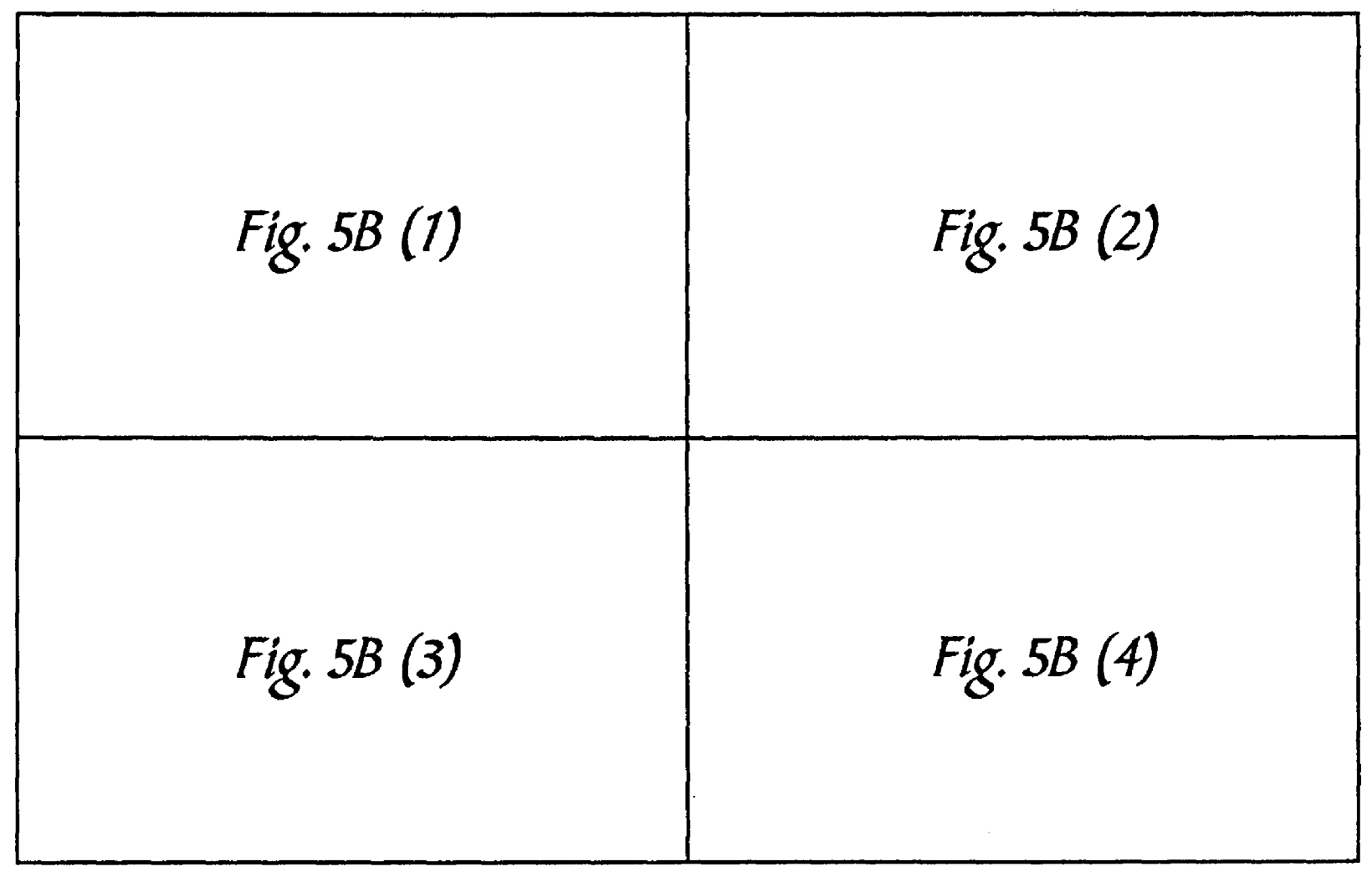

FIGS. 5A and 5B show further examples of application landscapes drawn up with a method and presented by a display apparatus according to an alternative implementation of the display apparatus. These examples are directed to applications of a company in the service sector, such as a banking company. Again, the rows represent main bank products, such as "current account," "payment," and "securities," while the columns represent top business processes, such as "product development," "sales," and "risk management," for example. The applications used in the business processes in connection with the main bank products are presented as individual presentation boxes, as described in connection with the automotive industry above.

As already mentioned above, a priority status or rank value may be assigned to at least part of the applications. This rank value may be assigned to the respective entries in the content containers. A user may set a visual filtering preference or detail value or parameter which may be inputted via the input device 12 which helps to define the degree of detail that should be presented in the visualization of the application landscape. When preparing the process-product matrix, it is preferable that the only applications to be considered and presented are those in which the priority status and/or rank value is higher than a predefined detail value. Employing a priority status and/or rank value to indicate those applications that will be included in the process-product matrix visualization allows for size reduction of the resulting matrix.

FIGS. 5A and 5B are presentations for the same company and, in particular, visualizations of the same application landscape, where FIG. 5B shows the application landscape in more detail. In particular, FIG. 5A does not show all of the applications presented in FIG. 5B. Only the most important applications e.g., applications with a rank value higher than a predetermined detail value, may be considered when preparing and visualizing the process-product matrix. In a first cell $b_{1,1}$, shown in FIG. 5A there is only one first application "06_02_20" with a rank value high enough to be presented under the conditions defined by the detail parameter. If the detail parameters are changed so that the application landscape is presented in more detail, as shown in FIG. 5B, applications with a lower rank, such as "05-02-05," are also shown in the first cell $b_{1,1}$, for example.

A rank may also be defined for processes and products. When rank values for the applications, processes, products, or any combination thereof are defined, it is possible to adapt the details and the legibility of the visualized application landscape for the intended purpose.

Figure 6:
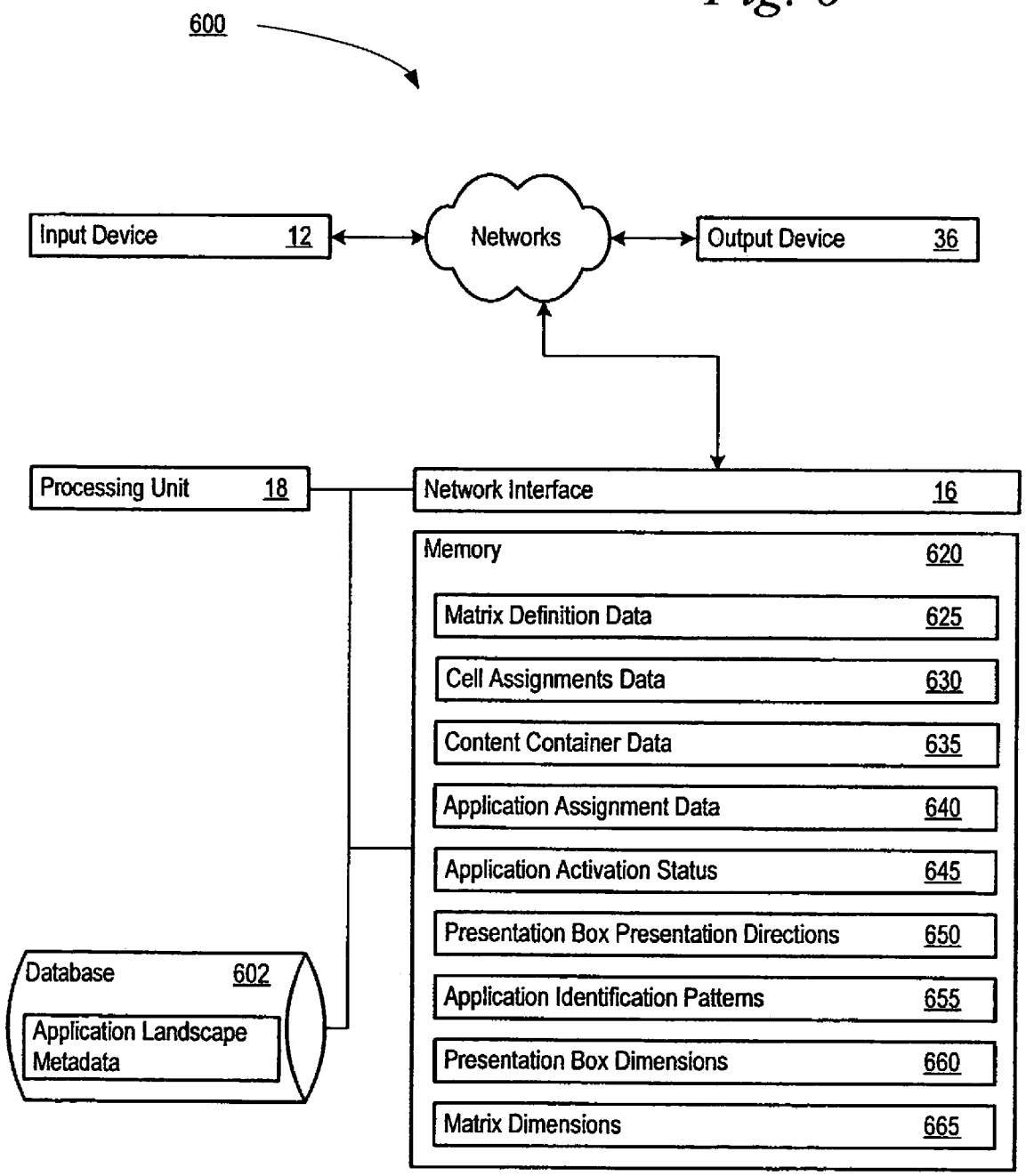
FIG. 6 illustrates a display apparatus system configuration made up of an input device, processing unit and output device, as well as a database storage, memory and processor.

As shown in FIG. 6, the an application visualization system 600 that may include an input device 12, processing unit 18, output device 36 and network interface 16, as well as a database 602, and memory 620. In an alternative implementation the database 602 may store application landscape metadata attributes and/or procedural rules for constructing the visualization. In one implementation the memory 620 may store the data described above, including: matrix definition data 625; cell assignments data 630; content container data 635; application assignment data 640; application activation status 645; presentation box presentation directions 650; application identification patterns 655; presentation box dimensions 660; and matrix dimensions 665. The database 602 may be employed to record visualizations, and/or optimize performance, configured and sized to cache processing of the visualization. Similarly, the memory 620 and processor may be configured and sized to optimize processing of the visualization.

Figure 7:
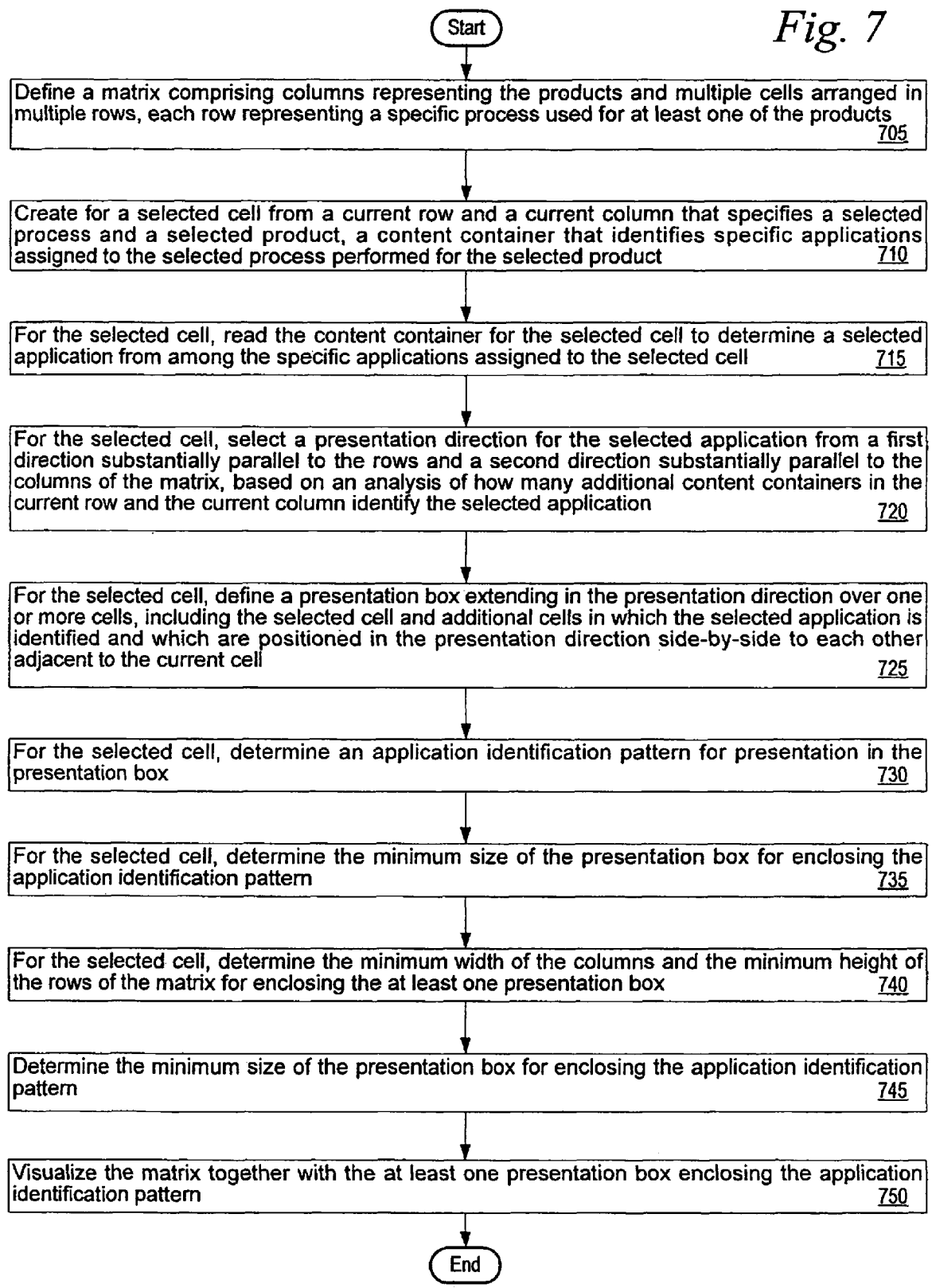
FIG. 7 shows a flow diagram outlining the method of visualizing the application landscape.

FIG. 7 shows the acts that the systems described above may take to determine and render the visualization of the application landscape. The systems may define a matrix that includes columns representing the products and multiple cells arranged in multiple rows, each row representing a specific process used for at least one of the products (Act 705). The system may also perform cell assignments that create for a selected cell from a current row and a current column that specifies a selected process and a selected product, a content container that identifies specific applications assigned to the selected process performed for the selected product (Act 710). The system may alternatively read content containers for each selected cell to determine a selected application from among the specific applications assigned to the selected cell (Act 715). The system may select a presentation direction for the selected application from a first direction substantially parallel to the rows and a second direction substantially parallel to the columns of the matrix, based on an analysis of how many additional content containers in the current row and the current column identify the selected application (Act 720). The system may further define a presentation box extending in the presentation direction over one or more cells, including the selected cell and additional cells in which the selected application is identified and which are positioned in the presentation direction side-by-side to each other adjacent to the current cell (Act 725). The system may determine an application identification pattern for presentation in the presentation box (Act 730). The system may also determine the minimum size of the presentation box for enclosing the application identification pattern (Act 735). The system may alternatively determine the minimum width of the columns and the minimum height of the rows of the matrix for enclosing the at least one presentation box (Act 740). The system may further determine the minimum size of the presentation box for enclosing the application identification pattern (Act 745). The system may also visualize the matrix together with the at least one presentation box enclosing the application identification pattern (Act 750).

Accordingly, as described in detail above, in one implementation of the apparatus, each row represents one of the multiple of products, while each column represents one of the multiple of processes. In another implementation, the role of rows and columns is exchanged so that each row represents one of the multiple of processes, while each column represents one of the multiple of products. The evaluation component may operate on each cell one after the other, by the row from the upper left corner to the lower right corner.

For each application identified in a content container, the content container may further define whether the application is activated or deactivated in the cell. Accordingly, an activation status may be assigned to each application in each content container. The apparatus includes a component for performing for each cell the step of determining whether the application is activated or deactivated in the cell. The presentation preparation step for each application may only be performed if the application is activated in the cell, and the presentation box may be defined so as to extend in the presentation direction substantially over the current cell and all cells in which, and only in which, the application is activated, and which are positioned in the presentation direction side-by-side to each other adjacent to the current cell. Ideally, the apparatus is also made up of a deactivation component to deactivate the application in all cells in which, and only in which, the application is activated, and which are positioned in the presentation direction side by side to each other adjacent to the current cell.

During the step of selecting a presentation direction, the evaluation component may be capable of: determining a row-related appearance number defining how many cells' content containers in the current row contain the application, and determining a column-related appearance number defining how many cells' content containers in the current column contain the application; and selecting a presentation direction for the application from a direction substantially parallel to either the rows or the columns of the matrix, depending the difference between the row-related and column-related appearance numbers of the application.

In an alternative implementation of the apparatus, a vertical presentation direction is selected for the application only if the vertical (column-related) appearance number is by more than one larger than the horizontal (row-related) appearance number. In the presentation preparation step, the evaluation component may be capable of performing a step of assigning the application in the current cell to a presentation slot extending in the presentation direction substantially over the whole matrix, where the presentation slot is a subdivision of either the current row or column if the presentation direction is substantially parallel to the rows or columns, respectively, so as to obtain a row-related or column-related presentation slot, respectively. The presentation box may be positioned substantially inside the presentation slot.

In another implementation of the display apparatus, assigning the application in the current cell to a presentation slot may include: determining whether a presentation slot for the selected presentation direction, which intersects with the current cell to which the application has also been assigned in another cell, already exists; assigning the application to the presentation slot in the current cell, if such a presentation slot already exists; and creating a new presentation slot and assigning the application in the current cell to the new presentation slot if such a presentation slot does not already exist.

Different presentation slots for the same presentation direction may not substantially overlap. Adjacent presentation slots may have a common borderline. The display apparatus may also implement a grouping component capable of performing a step of shifting, moving, relocating, or any combination thereof, all presentation boxes located in a first presentation slot to a second presentation slot if for all cells, in which the first presentation slot is occupied by the presentation boxes, and the second presentation slot is not occupied by any presentation boxes. Further, the grouping component may be capable of deleting the empty first presentation slot after all presentation boxes originally positioned in the first presentation slot are shifted to the second presentation slot.

The display apparatus may also be made up of an overlap elimination component capable of performing: a step of determining an overlap cell in which an overlap between presentation boxes for different presentation directions occurs; and a first overlap elimination step may include reducing the size of a first presentation box that has a first presentation direction by shifting a first edge of the first presentation box within the overlap cell in a first shifting direction parallel to the first presentation direction until the first presentation box no longer overlaps with any presentation box that has a second presentation direction different from the first presentation direction within the overlap cell.

After the first overlap elimination step, the overlap elimination component may perform a second overlap elimination step that includes reducing the size of a second presentation box that has the second presentation direction by shifting a second edge of the second presentation box within the overlap cell in a second shifting direction parallel to the second presentation direction until the second presentation box no longer overlaps with any presentation box that has the first presentation direction within the overlap cell.

After the second overlap elimination step, the overlap elimination component may further perform a third overlap elimination step that may include increasing the size of the first presentation box by shifting the first edge of the first presentation box within the overlap cell against the first presentation direction, as long as no overlap with any presentation box that has the second presentation direction is created within the overlap cell.

An alternative implementation further provides a computer-implemented method for drawing up an application landscape visualizing the assignment of applications to multiple processes performed in connection with one or more manufacturing or services products, the method may include the steps of: defining a matrix that has multiple cells arranged in rows representing the products, and columns representing the processes; creating for each cell a content container identifying the applications assigned to the process in used in connection with the product represented by the cell; performing both for each cell the reading of the content container to determine the applications assigned to the cell and for each application a presentation preparation step, and determining the minimum width or height of each column or row, respectively, necessary to enclose a presentation box; and visualizing the matrix with a presentation box enclosing an application identifier.

The presentation preparation step of the computer-implemented method may further include the following steps: selecting a presentation direction, either horizontal or vertical depending on how many of the content containers of the cells in the current row and column contain the application; defining a presentation box extending in the presentation direction over one or more cells including the current cell and all cells in which the application is identified in a corresponding content container positioned in the presentation direction side-by-side to each other adjacent to the current cell; determining an application identifier that will be presented in the presentation box; and determining the minimum size of the presentation box necessary for enclosing the application identification pattern.

Accordingly, each cell represents a particular process within a particular product. Any number of applications may be used in connection with multiple processes and products, so that, as an example, one application may be assigned to multiple cells in the matrix. Consequently, the content container of a cell may contain multiple applications. Selecting a presentation direction may mean selecting "horizontal" (left-right) or "vertical" (up-down) without distinguishing between different orientations. Alternatively, when selecting a presentation direction, it may even be distinguished between different orientations (left or right or up or down). Defining a matrix ideally includes identifying row indices and/or names and column indices and/or names. If multiple presentation boxes are presented, they may not substantially overlap e.g., they may have a common borderline, but may not form an overlap area.

For each application identified in a content container, the content container may further define whether the application is activated or deactivated in the cell. The method may also include for a cell the step of determining for the assigned applications whether the application is activated or deactivated in the cell. The presentation preparation step for an application may only be performed if the application is activated in the cell. The presentation box may be defined so as to extend in the presentation direction over the current cell and all cells in which, and only in which, the application is activated and which are positioned in the presentation direction side by side to each other adjacent to the current cell. The method further includes a step of deactivating the application in all cells in which, and only in which, the application is activated, and which are positioned in the presentation direction side-by-side to each other, and adjacent to the current cell. The application may not be deactivated in the current cell itself.

The step of selecting a presentation direction may include the steps of: determining a row-related appearance number defining how many of the cells' content containers in the current row contain the application, and determining a column-related appearance number defining how many of the cells' content containers in the current column contain the application; and selecting a presentation direction for the application from a direction substantially parallel to the rows or columns of the matrix, may depend on the difference between the application's row-related and the column-related appearance numbers. A vertical presentation direction may be selected for the application only if the vertical appearance number is by more than one larger than the horizontal appearance number.

The presentation preparation step may include the step of assigning the application in the current cell to a presentation slot extending in the presentation direction substantially over the whole matrix, where the presentation slot is a subdivision of either the current row or column if the presentation direction is substantially parallel to the rows or columns, respectively, so as to obtain a row-related or column-related presentation slot, respectively. The presentation box may be positioned substantially inside the presentation slot.

In one implementation, the step of assigning the application in the current cell to a presentation slot may include: determining whether a presentation slot for the selected presentation direction, which intersects with the current cell and to which the application has been assigned in another cell, already exists; assigning the application to the presentation slot in the current cell, if such a presentation slot already exists; and creating a new presentation slot and assigning the application in the current cell to the new presentation slot, if such a presentation slot does not already exist.

The system may establish different presentation slots for the same presentation direction that do not substantially overlap.

The method may also include a step of shifting, moving, relocating, or any combination thereof, all presentation boxes located in a first presentation slot to a second presentation slot if for all cells, in which the first presentation slot is occupied by the presentation boxes, and the second presentation slot is not occupied by any presentation boxes. Empty presentation slots may be deleted afterwards.

The method may include: a step of determining an overlap cell in which an overlap between presentation boxes for different presentation directions occurs; and a first overlap elimination step that may include reducing the size of a first presentation box that has a first presentation direction by shifting a first edge of the first presentation box within the overlap cell in a first shifting direction parallel to the first presentation direction until the first presentation box no longer overlaps with any presentation box that has a second presentation direction different from the first presentation direction within the overlap cell.

After the first overlap elimination step, the method may include a second overlap elimination step that reduces the size of a second presentation box that has the second presentation direction by shifting a second edge of the second presentation box within the overlap cell in a second shifting direction parallel to the second presentation direction until the second presentation box no longer overlaps with any presentation box that has the first presentation direction within the overlap cell.

After the second overlap elimination step, the method may further perform a third overlap elimination step that increases the size of the first presentation box by shifting the first edge of the first presentation box within the overlap cell against the first presentation direction, as long as no overlap with any presentation box that has the second presentation direction is created within the overlap cell.

The system further provides a computer program product that includes program code, which when loaded in a computer system causes the system to perform steps according to a method as described above.

The method, system and product may be implemented in digital electronic circuitry, or in computer hardware, firmware, software, or in combinations of them. The system may alternatively be implemented as a computer program product; for example, a computer program tangibly embodied in an information carrier, such as those found in a machine-readable storage device or in a propagated signal for use by a data processing apparatus, such as a programmable processor, a computer, or even multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The method steps of one implementation may be performed by one or more programmable processors executing a computer program to perform functions of the method by operating on input data and generating output. The method steps may also be performed by, and alternative implementations of various aspects of the display apparatus may be implemented as, a special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any type of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass data storage devices, such as magnetic, magneto-optical disks, or optical disks. Information carriers suitable for embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the display apparatus may be implemented on a computer that has a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The display device may be implemented in a computing system that includes a back-end component, such as a data server, a middleware component, such as an application server, or a front-end component, such as a client computer that has a graphical user interface or a Web browser through which a user can interact with an implementation of the display apparatus, or any combination of such back-end, middleware, or front-end components. The components of the system can be interconnected by any form or medium of digital data communication, such as a communication network. Examples of communication networks include a local area network ("LAN"), a wide area network ("WAN"), and the Internet.

The computing system can include clients and servers. A client and server are generally remote from each other and typically interact through a communication network. The relationship between client and server arises by virtue of computer programs running on the respective computers and having a client-server relationship to each other.

An exemplary system for implementing the display device includes a general purpose computing device in the form of a conventional computing environment (e.g. personal computer or a laptop), including a processing unit, a system memory, and a system bus that couples various system components including the system memory to the processing unit. The processing unit may perform arithmetic, logic, and control operations by accessing system memory. The system memory may store information and instructions for use in combination with the processing unit. The system memory may include volatile and non-volatile memory, such as random access memory (RAM) and read only memory (ROM). A basic input/output system (BIOS) containing the basic routines that help transfer information between elements within the personal computer, such as during start-up, may be stored in ROM. The system bus may be any of several types of bus structures including a memory bus or memory controller, a peripheral bus, and a local bus using any of a variety of bus architectures.

The personal computer may further include a hard disk drive for reading from and writing to a hard disk, and an external disk drive for reading from or writing to a removable disk. The removable disk may be a magnetic disk for a magnetic disk driver or an optical disk such as a CD ROM for an optical disk drive. The hard disk drive and external disk drive are connected to the system bus by a hard disk drive interface and an external disk drive interface, respectively. The drives and their associated computer-readable media provide non-volatile storage of computer readable instructions, data structures, program modules and other data for the personal computer. The data structures may include relevant data regarding the implementation of the visualization method, as described above and, in particular, data for defining the assignment of applications to the processes performed in connection with the products. The relevant data may be organized in a database, for example in a relational or object database.

Although the computing environment presently described employs a hard disk and an external disk, it should be appreciated by those skilled in the art that other types of computer readable media which can store data accessible by a computer, such as magnetic cassettes, flash memory cards, digital video disks, random access memories, read only memories, and the like, may also be used in the exemplary operating environment.

A number of program modules may be stored on the hard disk, external disk, ROM or RAM, including an operating system, one or more application programs, other program modules (not shown), and program data. The application programs may include at least a part of the functionality as indicated in FIGS. 1 through 7.

A user may enter commands and information, as discussed above, into the personal computer through input devices such as a keyboard and mouse. Other input devices may include a microphone (or other sensors), joystick, game pad, scanner, or the like. These and other input devices may be connected to the processing unit through a serial port interface that is coupled to the system bus, or may be collected by other interfaces, such as a parallel port interface, game port, or a universal serial bus (USB). Further, information may be printed using printer. The printer, and other parallel input/output devices, may be connected to the processing unit through parallel port interface. A monitor or other type of display device is also connected to the system bus via an interface, such as a video input/output. In addition to the monitor, a computing environment may include other peripheral output devices, such as speakers or other audible output.

The computing environment may communicate with other electronic devices such as a computer, telephone (wired or wireless), personal digital assistant, television, or the like. To communicate, the computer environment may operate in a networked environment using connections to one or more electronic devices. The computer environment may also be networked with a remote computer. The remote computer may be another computing environment such as a server, a router, a network PC, a peer device, or other common network node, and may include many or all of the elements described above relative to the computing environment. The logical connections may include a local area network (LAN) and a wide area network (WAN). Such networking environments are commonplace in offices, enterprise-wide computer networks, intranets and the Internet.

When used in a LAN networking environment, the computing environment may be connected to the LAN through a network I/O. When used in a WAN networking environment, the computing environment may include a modem or other means for establishing communications over the WAN. The modem, which may be internal or external to a computing environment, is connected to the system bus via the serial port interface. In a networked environment, program modules depicted relative to the computing environment, or portions thereof, may be stored in a remote memory storage device resident on, or accessible to, a remote computer. Furthermore, other data relevant to the application of the insurance claim management evaluation method (described in more detail further below) may be resident on or accessible via the remote computer. For example, the data may be stored in an object or a relation database. It will be appreciated that the network connections shown are for example only, and other means of establishing a communications link between the electronic devices may be used.

The above-described computing system is only one example of the type of computing system that may be used to implement the display apparatus.

A number of embodiments have been described. Nevertheless, it will be understood that various modifications may be made without departing from the spirit and scope of the invention. Accordingly, other embodiments are within the scope of the following claims.

The invention claimed is:

1. A display apparatus for visualizing the assignment of applications to multiple processes performed in connection with multiple products, the apparatus comprising:
   an input device operable to receive assignment data defining an assignment of applications to processes performed in connection with products;
   a matrix definition component operable to define a matrix comprising columns representing the products and multiple cells arranged in multiple rows, each row representing a specific process used for at least one of the products;
   a cell assignment component operable to create, for a selected cell from a current row and a current column that specifies a selected process and a selected product, a content container that identifies specific applications assigned to the selected process performed for the selected product;

an evaluation component operable to, for the selected cell:

read the content container for the selected cell to determine a selected application from among the specific applications assigned to the selected cell;

select a presentation direction for the selected application from a first direction substantially parallel to the rows and a second direction substantially parallel to the columns of the matrix, based on an analysis of how many additional content containers in the current row and the current column identify the selected application;

define a presentation box extending in the presentation direction over one or more of the cells, including the selected cell and additional cells in which the selected application is identified and which are positioned in the presentation direction side-by-side to each other adjacent to the current cell;

determine an application identification pattern for presentation in the presentation box; and determine a minimum size of the presentation box for enclosing the application identification pattern;

determine a minimum width of the columns and a minimum height of the rows of the matrix for enclosing the at least one presentation box; and an output device operable to display the matrix and the presentation box enclosing the application identification pattern.

2. The display apparatus according to claim 1, wherein the content container specifies whether the specific applications are activated or deactivated;

the evaluation component is further operable to determine whether the selected application is activated;

the evaluation component executes only when the selected application is activated;

the presentation box extends in the presentation direction over the selected cell and additional cells only in which the application is activated and which are positioned in the presentation direction side-by-side to each other adjacent to the selected cell; and the apparatus further comprises a deactivation component operable to deactivate the selected application in cells only in which the selected application is currently activated and which are positioned in the presentation direction side-by-side to each other adjacent to the selected cell.

3. A display apparatus according to claim 1, wherein the evaluation component is further operable to:

determine a row related appearance number defining how many content containers of cells in the current row identify the application, and determine a column related appearance number defining how many content containers of cells in the current column contain the application; and select the presentation direction for the selected application based on a difference between the row related appearance number and the column related appearance number.

4. A display apparatus according to claim 1, wherein the evaluation component is further operable to:

assign the selected application in the selected cell to a first presentation slot extending in the presentation direction, where the first presentation slot is a subdivision of the current row or a subdivision of the current column when the presentation direction is substantially parallel to the current row or the current column, respectively, and where the presentation box is positioned substantially inside the first presentation slot.

5. A display apparatus according to claim 4, wherein the evaluation component is further operable to:

determine whether a defined presentation slot already exists for the selected presentation direction that intersects with the selected' cell and to which the selected application has been assigned in a different cell;

assign the selected application to the defined presentation slot for the selected cell when the defined presentation slot already exists; and create the first presentation slot and assign the selected application in the selected cell to the first presentation slot, when the defined presentation slot does not already exist.

6. A display apparatus according to claim 4, where different presentation slots for the same presentation direction do not substantially overlap.

7. A display apparatus according to claim 4, further comprising:

a grouping component operable to shift multiple presentation boxes located in the first presentation slot to a second presentation slot when for all cells in which the first presentation slot is occupied by presentation boxes, the second presentation slot is not occupied by any presentation boxes.

8. A display apparatus according to claim 1, further comprising an overlap elimination component operable to:

determine at least one overlap cell in which at least one overlap between presentation boxes for different presentation directions occurs; and eliminate overlap by reducing a size of at least one first presentation box having a first presentation direction by shifting a first edge of the first presentation box within the overlap cell in a first shifting direction parallel to the first presentation direction until the first presentation box no longer overlaps with any presentation box having a second presentation direction different from the first presentation direction within the overlap cell.

9. A display apparatus according to claim 8, wherein the overlap elimination component is further operable to further eliminate overlap by:

reducing a size of at least one second presentation box having a second presentation direction by shifting a second edge of the second presentation box within the overlap cell in a second shifting direction parallel to the second presentation direction until the second presentation box no longer overlaps with any presentation box having the first presentation direction within the overlap cell.

10. A display apparatus according to claim 9, wherein the overlap elimination component is further operable to eliminate overlap by:

increasing the size of the first presentation box by shifting the first edge of the first presentation box within the overlap cell in the first presentation direction as long as no overlap with any presentation box having the second presentation direction is created within the overlap cell.

11. A computer-implemented method of visualizing the assignment of applications to multiple processes performed in connection with multiple products, the method comprising:

defining a matrix comprising columns representing the products and multiple cells arranged in multiple rows, each row representing a specific process used for at least one of the products;

creating for a selected cell from a current row and a current column that specifies a selected process and a selected product, a content container that identifies specific applications assigned to the selected process performed for the selected product;

performing, by the computer, for the selected cell the following steps:

reading the content container for the selected cell to determine a selected application from among the specific applications assigned to the selected cell;

selecting a presentation direction for the selected application from a first direction substantially parallel to the rows and a second direction substantially parallel to the columns of the matrix, based on an analysis of how many additional content containers in the current row and current column identify the selected application;

defining a presentation box extending in the presentation direction over one or more cells, including the selected cell and additional cells in which the selected application is identified and which are positioned in the presentation direction side-by-side to each other adjacent to the current cell;

determining an application identification pattern for presentation in the presentation box; and determining the minimum size of the presentation box for enclosing the application identification pattern;

determining the minimum width of the columns and the minimum height of the rows of the matrix for enclosing the at least one presentation box; and visualizing the matrix together with the at least one presentation box enclosing the application identification pattern.

12. The method according to claim 11, wherein the content container specifies whether the specific applications are activated or deactivated;

the evaluation component is further operable to determine whether the selected application is activated;

the evaluation component executes only when the selected application is activated;

the presentation box extends in the presentation direction over the selected cell and additional cells only in which the application is activated and which are positioned in the presentation direction side by side to each other adjacent to the selected cell; and the method further comprises a deactivation component operable to deactivate the selected application in cells only in which the selected application is currently activated and which are positioned in the presentation direction side by side to each other adjacent to the selected cell.

13. Method according to claim 11, wherein the evaluation component is further operable to:

determine a row related appearance number defining how many content containers of cells in the current row identify the application, and determine a column related appearance number defining how many content containers of cells in the current column contain the application; and select a presentation direction for the selected application based on a difference between the row related appearance number and the column related appearance number.

14. The method according to claim 11, wherein the evaluation component is further operable to:

assign the selected application in the selected cell to a first presentation slot extending in the presentation direction, where the first presentation slot is a subdivision of the current row or a subdivision of the current column when the presentation direction is substantially parallel to the current row or the current column, respectively, and where the presentation box is positioned substantially inside the presentation slot.

15. The method according to claim 14, wherein the evaluation component is further operable to:

determine, whether a defined presentation slot already exists for the selected presentation direction that intersects with the selected cell and to which the selected application has been assigned in a different cell;

assign the selected application to the defined presentation slot for the selected cell, when the defined presentation slot already exists; and create a new presentation slot and assign the selected application in the selected cell to the new presentation slot, when the defined presentation slot does not already exist.

16. The method according to claim 14, where different presentation slots for the same presentation direction do not substantially overlap.

17. The method according to claim 14, further comprising:

a grouping component operable to shift multiple presentation boxes located in the first presentation slot to a second presentation slot when for all cells in which the first presentation slot is occupied by presentation boxes, the second presentation slot is not occupied by any presentation boxes.

18. The method according to claim 11, further comprising an overlap elimination component operable to:

determine at least one overlap cell in which at least one overlap between presentation boxes for different presentation directions occurs; and eliminate overlap by reducing a size of at least one first presentation box having a first presentation direction by shifting a first edge of the first presentation box within the overlap cell in a first shifting direction parallel to the first presentation direction until the first presentation box no longer overlaps with any presentation box having a second presentation direction different from the first presentation direction within the overlap cell.

19. The method according to claim 18, wherein the first overlap elimination component is further operable to further eliminate overlap by:

reducing a size of at least one second presentation box having the second presentation direction by shifting a second edge of the second presentation box within the overlap cell in a second shifting direction parallel to the second presentation direction until the second presentation box no longer overlaps with any presentation box having the first presentation direction within the overlap cell.

20. The method according to claim 19, wherein the overlap elimination component is further operable to eliminate overlap by:

increasing the size of the first presentation box by shifting the first edge of the first presentation box within the overlap cell in the first presentation direction as long as no overlap with any presentation box having the second presentation direction is created within the overlap cell.

21. A product comprising:
a non-transitory machine readable medium; and
instructions stored on the medium which cause a data processing system to perform a method comprising:
defining a matrix comprising columns representing the products and multiple cells arranged in multiple rows, each row representing a specific process used for at least one of the products;
creating for a selected cell from a current row and a current column that specifies a selected process and a selected product, a content container that identifies specific applications assigned to the selected process performed for the selected product;
performing for the selected cell the following steps:
reading the content container for the selected cell to determine a selected application from among the specific applications assigned to the selected cell;
selecting a presentation direction for the selected application from a first direction substantially parallel to the rows and a second direction substantially parallel to the columns of the matrix, based on an analysis of how many additional content containers in the current row and the current column identify the selected application;
defining a presentation box extending in the presentation direction over one or more cells, including the selected cell and additional cells in which the selected application is identified and which are positioned in the presentation direction side-by-side to each other adjacent to the current cell;
determining an application identification pattern for presentation in the presentation box; and
determining the minimum size of the presentation box for enclosing the application identification pattern;
determining the minimum width of the columns and the minimum height of the rows of the matrix for enclosing the at least one presentation box; and
visualizing the matrix together with the at least one presentation box enclosing the application identification pattern.

22. The product of claim 21, wherein
the content container specifies whether the specific applications are activated or deactivated;
the evaluation component is further operable to determine whether the selected application is activated;
the evaluation component executes only when the selected application is activated;
the presentation box extends in the presentation direction over the selected cell and additional cells only in which the application is activated and which are positioned in the presentation direction side by side to each other adjacent to the selected cell; and
the method further comprises a deactivation component operable to deactivate the selected application in cells only in which the selected application is currently activated and which are positioned in the presentation direction side by side to each other adjacent to the selected cell.

23. The product of claim 21, wherein the evaluation component is further operable to:
determine a row related appearance number defining how many content containers of cells in the current row identify the application, and determine a column related appearance number defining how many containers of cells in the current column contain the application; and
select a presentation direction for the selected application based on a difference between the row related appearance number and the column related appearance number.

24. The product of claim 21, wherein the evaluation component is further operable to:
assign the selected application in the selected cell to a first presentation slot extending in the presentation direction, where the first presentation slot is a subdivision of the current row or a subdivision of the current column when the presentation direction is substantially parallel to the current row or the current column, respectively, and
where the presentation box is positioned substantially inside the presentation slot.

25. The product of claim 21, further comprising an overlap elimination component operable to:
determine at least one overlap cell in which at least one overlap between presentation boxes for different presentation directions occurs; and
eliminate overlap by reducing a size of at least one first presentation box having a first presentation direction by shifting a first edge of the first presentation box within the overlap cell in a first shifting direction parallel to the first presentation direction until the first presentation box no longer overlaps with any presentation box having a second presentation direction different from the first presentation direction within the overlap cell.

* * * * *